United States Patent [19]
Ahad

[11] Patent Number: 5,337,676
[45] Date of Patent: Aug. 16, 1994

[54] TRACK DEVICE FOR MOUNTING AN ENTERTAINMENT MODULE IN CHAIRS SLOTTED

[75] Inventor: Munir J. Ahad, Newhall, Calif.

[73] Assignee: Nelson Hoffman, Inc., Pacoima, Calif.

[21] Appl. No.: 37,232

[22] Filed: Mar. 26, 1993

[51] Int. Cl.$^5$ .................. B61F 13/00; A47C 7/72
[52] U.S. Cl. ..................... 104/139; 104/307; 105/180; 297/194; 16/87.4 R
[58] Field of Search ........... 104/139, 140, 307; 105/180, 463.1; 297/194, 145; 211/41, 151, 162, 94; 16/91, 106, 107, 87.4 R; 312/330.1

[56] References Cited

U.S. PATENT DOCUMENTS

| | | | |
|---|---|---|---|
| 2,683,890 | 7/1954 | Rosenbaum | 16/87.4 R |
| 3,167,112 | 1/1965 | Tucker | 16/91 X |
| 4,864,686 | 9/1989 | Lasier et al. | 104/140 X |
| 5,046,861 | 9/1991 | Tarver | 312/330.1 X |
| 5,076,524 | 12/1991 | Reh et al. | 297/194 X |
| 5,131,818 | 7/1992 | Wittkop et al. | 417/DIG. 1 X |
| 5,197,447 | 1/1993 | Lain | 297/194 X |

FOREIGN PATENT DOCUMENTS 1427623  3/1976  United Kingdom ............ 16/87.4 R

OTHER PUBLICATIONS

"Engineering Materials and Their Applications: 3rd Edition"; Flinn et al; Houghton–Mifflin Company; Boston; 1986; pp. 396–397.

Primary Examiner—Robert J. Oberleitner
Assistant Examiner—S. Joseph Morano
Attorney, Agent, or Firm—Denton L. Anderson

[57] ABSTRACT

The invention provides a device for moving an object, such as an entertainment module, between a storage location within a housing location (such as the armrest of a seat) and a user location outside of the housing. The device employs a track with a central slot. A truck assembly is slideably attached to the track. The truck assembly has a load-bearing plate on one side of the track and a backing plate on the reverse side of the track. The load-bearing plate and the backing plate are held to one another by a pair of pins. Around each pin, disposed within the slot, is a bushing, preferably made of polyetheretherketone. It is also preferable that washers be disposed between the track plates and the track to assure smooth movement of the truck along the track. The device is ideally suited for moving an entertainment module, such as a video monitor, in and out of an armrest between two airline seats.

21 Claims, 3 Drawing Sheets

TRACK DEVICE FOR MOUNTING AN ENTERTAINMENT MODULE IN CHAIRS SLOTTED

FIELD OF THE INVENTION

The invention relates generally to track devices and specifically to track devices which can be enclosed within the armrest of a chair, seat or armrest between two seats.

BACKGROUND OF THE INVENTION

Competition within the airline industry has become exceptionally fierce since the airlines were deregulated in the early 1980s. All of the major airlines are continuously looking for new ways to attract passengers.

One way in which to attract passengers is to offer new and more exciting modes of in-flight passenger entertainment. One such new mode of entertainment is a video game system.

The problem with providing video games to individual passengers is that there is no ideal place to store the video game monitor. Some airlines have taken to installing the monitor in the back of the seat facing the passenger. This installation, however, places the video screen too far away from the user and the video screen is difficult to see when the seat is tilted backwards.

It has been proposed to store the video monitor in the armrest between the seats, especially between the large seats in first class sections. However, this requires some method of moving the video monitor from the armrest to a position where it can be viewed. To date, no such system has been devised which is fully satisfactory.

One system for storing the video monitor in the armrest uses a simple universal joint hinge affixed to the armrest at the upper, forward-most corner. The monitor is affixed to this hinge by a short attachment rod. The monitor is folded downwardly into a slot within the armrest when it is not in use, and then folded back upwardly when use is desired. Unfortunately, it has been found that the distance between the armrest and the rear of the next seat forward of the user is insufficient to allow an attachment rod of sufficient length for adequately displaying the monitor. Therefore, this system is not practical.

Track mechanisms are used in other applications to move an object between two locations. However, such track mechanisms are generally complex and expensive and/or are prone to binding or otherwise not operating smoothly. No track mechanism has as yet been proposed which is satisfactory for moving a video monitor into and out of an airliner armrest.

Accordingly, there is a need for a mechanism which can be used for applications such as moving a video monitor from within the armrest of an aircraft seat to a position where it is conveniently used by a passenger, wherein the mechanism is not unduly expensive, complicated to manufacture or maintain and wherein the mechanism is not prone to binding or otherwise operating in a non-smooth manner.

SUMMARY OF THE INVENTION

The invention satisfies this need. The invention is a device for moving an object between a first location and a second location using a track to which is attached a unique truck device.

The track is a planar strip of rigid material wherein the width of the material is generally disposed in a vertical plane. The track has a longitudinal slot of uniform dimension.

The truck is slideably attached to the track. The truck has a load-bearing plate which is disposed proximate to and in parallel with one side of the track. The truck also has a backing plate disposed on the opposite side of the track, disposed in parallel with the load-bearing plate. At least one pin is disposed through the load-bearing plate, through the slot and into the backing plate to hold the load-bearing plate and the backing plate together. A bushing having an outside diameter slightly smaller than the width of the slot is disposed around the pin within the slot.

Preferably the truck has two pins, one at either end with a bushing around each pin, and preferably the bushings are composed of polyetheretherketone. It is also preferable to dispose a washer between each of the truck plates and the track to assure that the truck moves smoothly along the track. Most preferably, the washers are composed of a fluorocarbon, such as Teflon ®.

It is further preferable that the pins be threadably attached to the load-bearing plate. This allows the distance between the load-bearing plate and the track to be adjustable. In a most preferred embodiment, an adjustment nut is disposed over the end of the pin.

The invention is ideal for using and storing an entertainment module, such as a video monitor. In such cases, the invention further comprises an attachment rod swivelably attached to the load-bearing plate and an entertainment module swivelably attached to the opposite end of the rod.

The invention can be used for video game systems in various modes of transportation such as railroad cars and commercial airliners. In such cases, the track is easily disposed within the armrest between two seats.

DESCRIPTION OF THE DRAWINGS

These and other features, aspects, and advantages of the present invention will become better understood with reference to the following description, appended claims, and accompanying drawings wherein:

DESCRIPTION OF THE INVENTION

Figure 1:
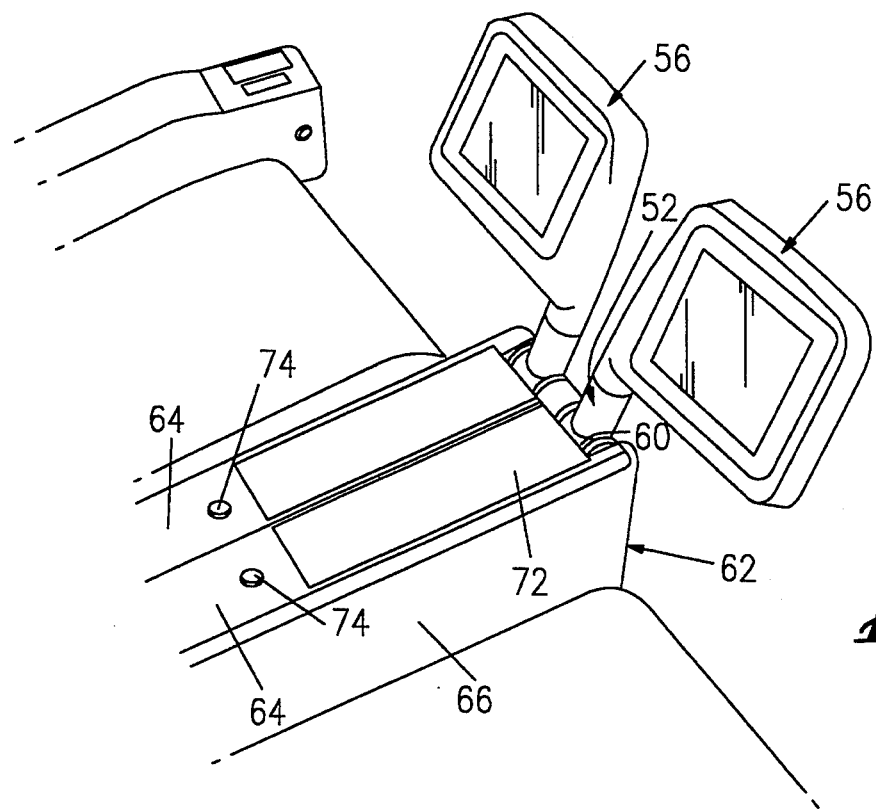
FIG. 1 is a perspective view of an armrest of an airliner seat employing two embodiments of the invention.
Figure 2:
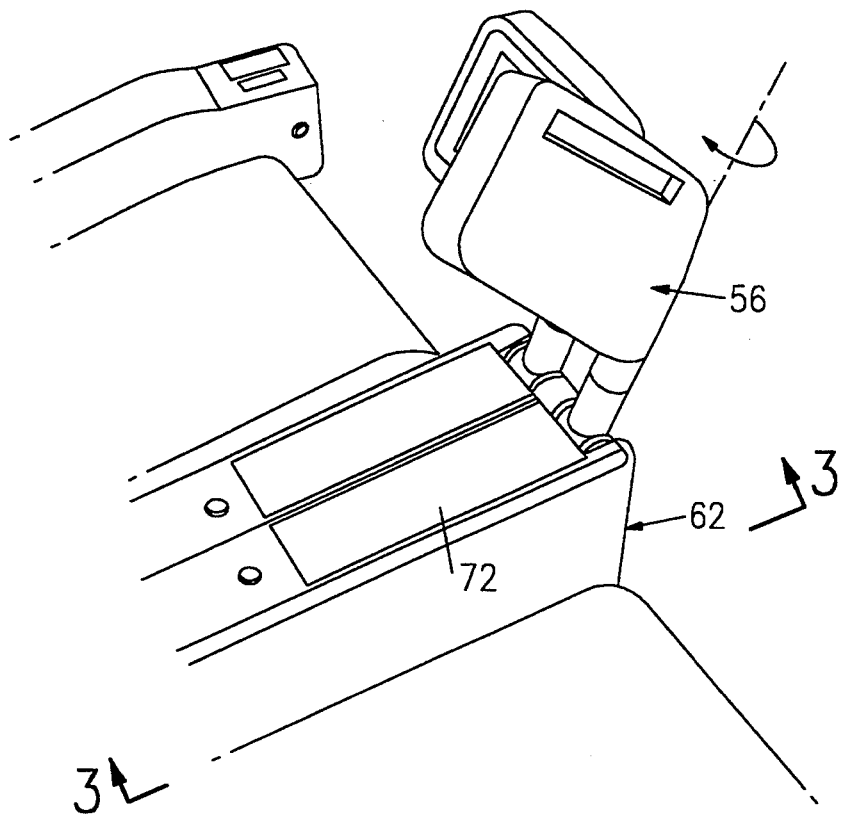
FIG. 2 is a perspective view of the armrest of FIG. 1 showing how a video monitor is pivoted on an attachment rod.

The invention is a device 10 for moving an object between a first location 12 and a second location 14. The device comprises a track 16 and a truck 18 slideably attached to the track 16.

Figure 3:
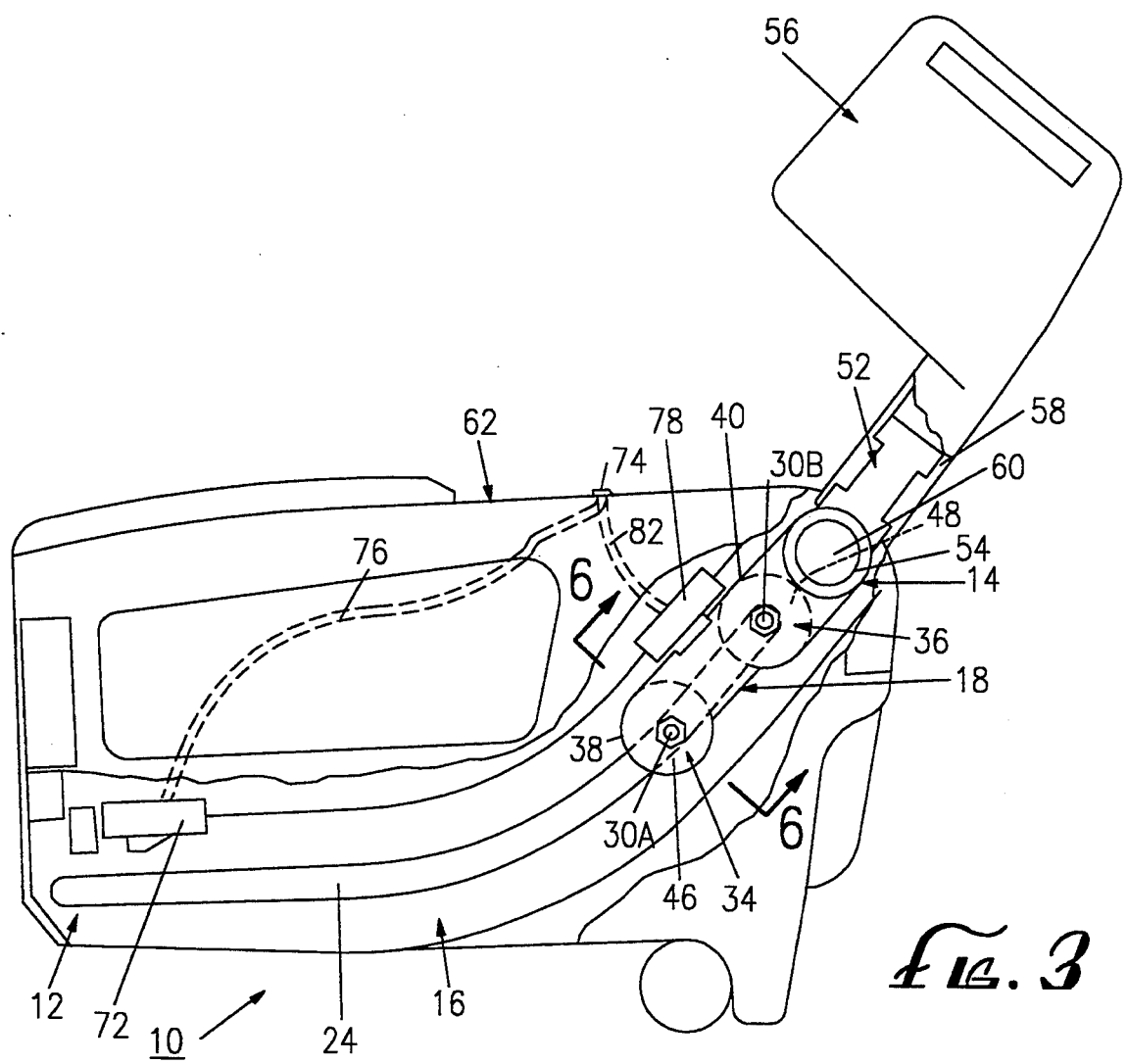
FIG. 3 is a side view in partial cross-section of the armrest shown in FIG. 2 taken along line 3-3.
Figure 4:
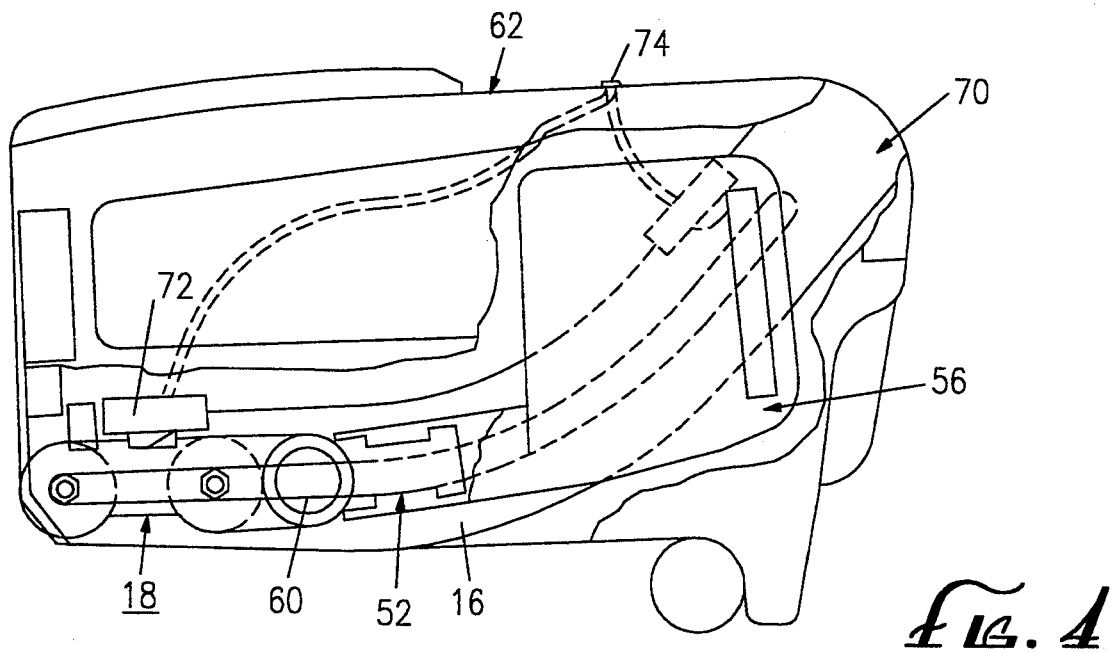
FIG. 4 is a side view in partial cross section of the armrest shown in FIG. 3 showing the video monitor fully enclosed within the armrest.
Figure 5:
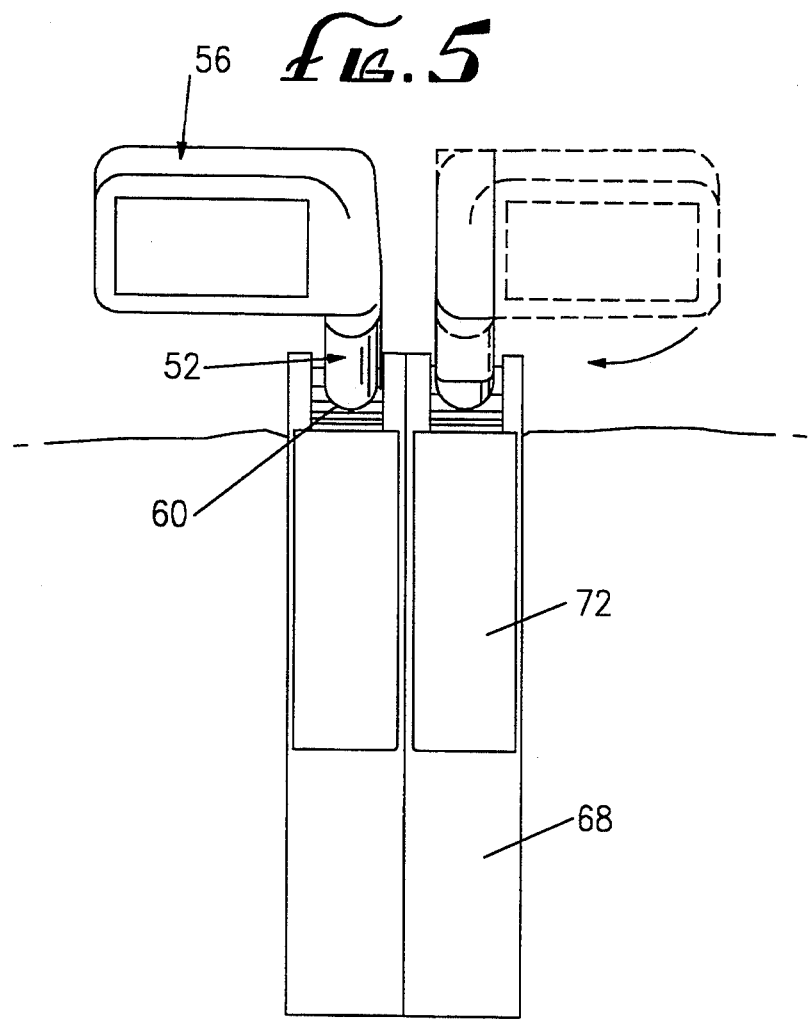
FIG. 5 is a front view of the armrest shown in FIG. 2.
Figure 6:
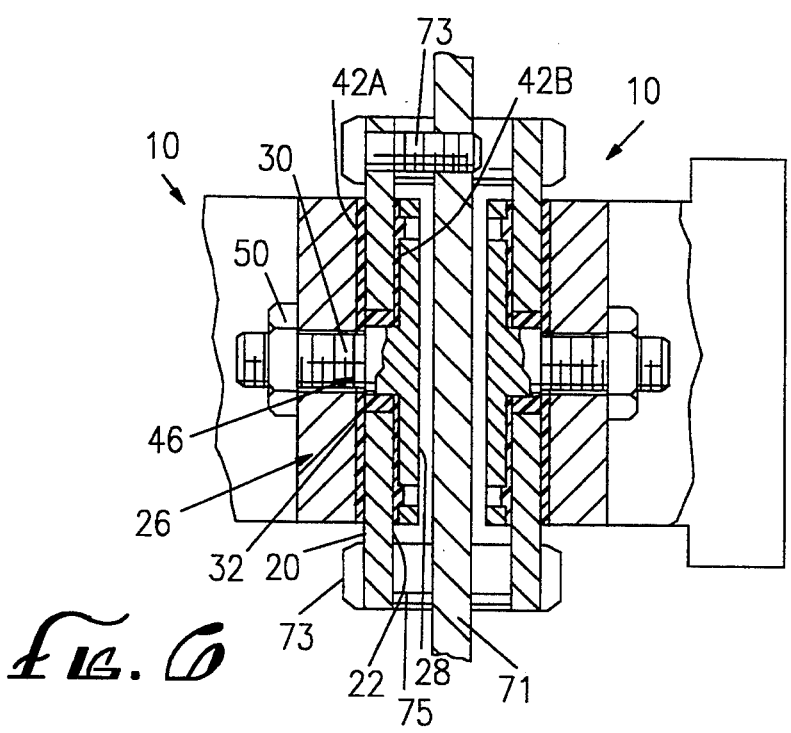
FIG. 6 is a cross-sectional detail view of the armrest shown in FIG. 3 taken along line 6-6.

As shown in FIGS. 3, 4 and 6, the track 16 has a height, a length, a first planar surface 20 and a second planar surface 22. The track 16 defines a slot 24 of substantially uniform width extending longitudinally between the first and second locations 12 and 14. The slot 24 has a width typically between 0.06 inches and about 0.25 inches, preferably between about 0.12 inches and about 0.20 inches. As shown in FIGS. 3 and 4, the track 16 does not have to be linear, although it is important that any curvature be smooth and without "kinks." In the embodiments shown in the drawings, the track has a horizontal moiety proximate to the first location and an upwardly sloping moiety proximate to the second location. In a typical embodiment, the track 16 is made of a lightweight rigid material, such as an aluminum or a rigid plastic. Aluminum alloy 7075-T6 can be used.

The truck 18 is comprised of a load-bearing plate 26, a backing plate 28, one or more pins 30 and a bushing 32 disposed around each of the pins 30.

The load-bearing plate 26 has a first end 34 and a second end 36 and is disposed proximate to and in parallel with the first surface of the track 20. Likewise, the backing plate 28 has a first end 38 and a second end 40. The backing plate 28 is disposed proximate to and in parallel with the second surface of the track 22. In a typical embodiment, the distance between each of the plates 26 and 28 and the corresponding sides of the track 20 or 22 is between about 0.001 and about 0.010 inches, preferably about 0.003 inches.

In the embodiment shown in the drawings, the truck 18 has a first pin 30a disposed through the first ends 34 and 38 of the load-bearing plate 26 and the backing plate 28 and a second pin 30b disposed through the second ends 36 and 40 of the load-bearing plate 26 and the backing plate 28. Both pins 30 are disposed through the slot 24.

A bushing 32 is disposed around each pin 30. Preferably, each bushing 32 is free to rotate around its respective pin 30. The bushings 32 have a diameter which is just slightly smaller than the width of the slot 24 so that the bushings allow the truck 18 to slide smoothly within the slot 24. In a typical embodiment, the clearance between the outside perimeter of the bushing 32 and the slot 24 is between about 0.005 inches and about 0.015 inches. Preferably, the bushing 32 is composed of a polyetheretherketone. Bushings 32 made of polyetheretherketone has been found to have outstanding resistance to wear and deformity.

Preferably the truck 18 further comprises a pair of washers 42 on each pin 30, one washer 42a disposed between the track 16 and the load-bearing plate 26 and a second washer 42b disposed between the track 16 and the backing plate 28. Preferably the washers 42a and 42b are made from a fluorocarbon such as Teflon ®.

In the embodiment shown in the drawings, the backing plate 28 is comprised of two moieties, a first moiety (which constitutes the first end 34 of the backing plate 28) and a second moiety (which constitutes the second end 36 of the backing plate 28). The first moiety is integral with the first pin 30a. Together, they form a first cap bolt 46. Likewise, the second moiety is integral with the second pin 30b. Together, they form a second cap bolt 48.

It is highly desirable that the pins 30 are threadably attached to the load-bearing plate 26 to maintain the distance between the load-bearing plate 26 and the track 16 constant and to allow the distance to be precisely adjusted. The threads in the load-bearing plate 26 are preferably self-locking helicoil threads. The threaded connection between the pins 30 and the load-bearing plate 26 allow the distance between the load-bearing plate 26 and the track 16 to be easily adjusted by torquing the pin 30 in one direction or the other. After such adjustment is accomplished, jam nuts 50 are placed over the ends of the pins 30 to preserve the adjustment by preventing the pins 30 from rotating in the load-bearing plate 26.

The invention is also a combination for alternatively using and storing an entertainment module 56. The combination comprises the track 16 and the truck 18 described above in combination with an attachment rod 52 swivelably attached at its first end 54 to the second end 36 of the load-bearing plate 26. The swivelable attachment between the first end 54 of the attachment rod 52 and the second end 36 of the load-bearing plate 26 comprises detents or friction surfaces so that the attachment rod 52 is adjustably swivelable and does not swivel freely.

An entertainment module 56 is attached to the second end 58 of the rod 52. In a typical embodiment the entertainment module 56 is a video monitor. The attachment arm 52 is swivelably affixed to the second end 36 of the load-bearing plate 26 by a swivel joint 60 which preferably allows the entertainment module 56 to be swivelled in two axial directions. The swivel joint 60 preferably comprises detents, friction surfaces or other suitable mechanism to prevent the entertainment module 56 from freely swiveling about the attachment arm 52. Rather, the entertainment module 56 is adjustably swivelable about the attachment arm 52 so that the user can adjust and retain the precise orientation of the entertainment module 56 at an optimum location.

The combination described above can also be used in combination with a housing 62, such as the armrest between two seats. The housing 62 has a top 64, opposing side walls 66 and opposing end walls 68. One of the end walls 68 defines a housing opening 70 sufficiently large to allow the entertainment module 56 to pass therethrough. The housing opening 70 can be normally covered with a small hinged door 72. The track 16 is disposed within the housing 62 with one end of the track 16 (at the second location 14) disposed proximate to the housing opening 70.

This combination is ideal for housing entertainment modules 56 in armrests between seats on modes of transportation, such as on railway passenger trains or airliners. The combination is simple and inexpensive to manufacture, dependable and easy to adjust and maintain.

The drawings show a typical example of two track mechanisms 10 disposed side-by-side in the armrest between two airliner passenger seats. In FIG. 6, the two track mechanisms 10 are shown attached on opposite sides of a vertical armrest structural web 71 by screws 73 using spacers 75.

As shown in FIGS. 3 and 4, the truck 18 can be slid along the track 16 between a first location 12 wherein the entertainment module 56 is fully housed within the housing 62, to the second location 14 wherein the pivot end 58 of the attachment rod 56 is outside of the housing 62, allowing the entertainment module 56 to be swivelled into an optimum disposition for use by an individual.

A first mechanical latch mechanism 72 holds the truck firmly at the first location 12 (storage location) wherein the entertainment module 56 is fully enclosed within the housing 62. The first latch mechanism 72 is released by a button 74 mechanically linked to the first latch mechanism 72 by a first linkage 76. The truck 18 is also firmly retained at the second location 14 by a second mechanical latch mechanism 78. The second latch mechanism 78 is also released by the button 74 via a second linkage 82.

In operation, a user sitting next to the armrest or other housing 62 wherein the truck 18 is stored at the first location 12, pushes the button 74 to release the first latch mechanism 72 and free up the truck 18 so it can be slid along the track 16.

The user then pulls gently on the entertainment module 56 and slides the entertainment module 56 out of the housing 62 until the truck 18 clicks into the second location 14 and is held fast by the second latch mechanism 78. The user then pivots the entertainment module 56 on the swivel joint 60 until the entertainment module 56 is in an optimum position for use.

When the user wishes to restore the entertainment module 56 to the housing 60, he or she presses the button 74 which releases the second latch mechanism 78 and allows the truck 18 to freely slide from the second location 14 towards the first location 12. The user then rotates the module 56 so that it fits within the housing opening 70 and gently pushes on the entertainment module 56 to push the truck 18 towards the first track location 12. When the module 56 is fully disposed within the housing 62, the truck 18 is at the first location 12 where it is again firmly retained by the first latch mechanism 72.

The foregoing describes in detail several preferred embodiments of the invention. The foregoing should not be construed, however, as limiting the invention to the particular embodiments describes. Practitioners skilled in the art will recognize numerous other embodiments as well. For a definition of the complete scope of the invention, the reader is directed to the appended claims.

What is claimed is:

1. A device for moving an object between a first location and a second location, comprising:
   (a) a tracking having a height, a length, a first planar surface and a second planar surface, the track defining a slot of substantially uniform width extending between the first and second locations; and
   (b) a truck slidably attached to the track comprising:
      (I) a load-bearing plate having a first end and a second end and being disposed proximate to and in parallel with the first surface of the track;
      (II) a backing plate having a first end and a second end and being disposed proximate to and in parallel with the second surface of the track;
      (III) a first pin disposed serially through (1) the first end of the load-bearing plate, (2) the slot in the track and (3) the first end of the backing plate, to connect the load bearing plate to the backing plate, the first pin being threadably attached to the load-bearing plate such that the load-bearing plate and the track are disposed spaced apart;
      (IV) a first jam nut threadably attached to the first pin; and
      (V) a first bushing having an outside diameter slightly smaller than the width of the slot and disposed around the first pin within the slot;
   whereby the threaded attachment of the first pin to the load-bearing plate allows the distance between the load-bearing plate and the track to be adjusted by torquing the first pin; and
   whereby the distance between the first pin and the track is preserved by the prevention of the rotation of the first pin by the jam nut.

2. The device of claim 1 further comprising:
   (a) a second pin disposed serially through (1) the second end of the load-bearing plate, (2) the slot in the track and (3) the second end of the backing plate, to connect the second end of the load-bearing plate to the second end of the backing plate, and
   (b) a second bushing having an outside diameter slightly smaller than the width of the slot and disposed around the second pin within the slot.

3. The device of claim 1 further comprising a first washer disposed between the load-bearing plate and the first surface of the track and a second washer disposed between the second surface of the track and the backing plate.

4. The device of claim 3 wherein the washers are composed of a fluorocarbon.

5. The device of claim 1 wherein the first pin and the backing plate are integral with one another and comprise a cap nut.

6. The device of claim 1 wherein the first bushing is composed of polyetheretherketone and can freely rotate about the first pin.

7. The device of claim 1 wherein the track has a horizontal moiety proximate to the first location and an upwardly sloping moiety proximate to the second location.

8. The device of claim 1 further comprising:
   (a) first latch mechanism means for releasably holding the truck at the first location; and
   (b) second latch mechanism means for releasably holding the truck at the second location.

9. A device for moving an object between a first location and a second location, comprising:
   (a) a track having a height, a length, a first planar surface and a second planar surface, the track defining a slot of substantially uniform width extending between the first and second locations, the track having a horizontal moiety proximate to the first location and an upwardly sloping moiety proximate to the second location; and
   (b) a truck slidably attached to the track comprising:
      (I) a load-bearing plate having a first end and a second end and being disposed proximate to and in parallel with the first surface of the track;
      (II) a backing plate having a first end and a second end and being disposed proximate to and in parallel with the second surface of the track;
      (III) a first fluorocarbon washer disposed between the first end of the load-bearing plate and the first surface of the track, a second fluorocarbon washer disposed between the second surface of the track and the first end of the backing plate, a third fluorocarbon washer disposed between the second end of the load-bearing plate and the first surface of the track and a fourth fluorocarbon washer disposed between the second surface of the track and the second end of the backing plate;
      (IV) a first threaded pin disposed serially through (1) the first end of the load-bearing plate, (2) the first washer, (3) the slot in the track (4) the second washer and (5) the first end of the backing plate, to connect the first end of the load-bearing plate to the first end of the backing plate, the first pin being threadably attached to the load-bearing plate such that the load-bearing plate and the track are disposed spaced apart;
      (V) a second threaded pin disposed serially through (1) the second end of the load-bearing plate, (2) the third washer, (3) the slot in the track (4) the fourth washer and (5) the second end of the backing plate, to connect the second end of the load-bearing plate to the second end of the backing plate, the second pin being threadably attached to the load-bearing plate, the second pin being threadably attached to the load-bearing plate such that the load-bearing plate and the track are disposed spaced apart;

(VI) a first jam nut threadably attached to the first pin and a second jam nut threadedly attached to the second pin; and (VII) a first polyetheretherketone bushing having an outside diameter slightly smaller than the width of the slot and disposed around the first pin within the slot in such a way that the first bushing can freely rotate about the first pin;

(VIII) a second polyetheretherketone bushing having an outside diameter slightly smaller than the width of the slot and disposed around the second pin within the slot in such a way that the second bushing can freely rotate about the second pin;

(IX) a first latch mechanism means for releasably holding the truck at the first location; and (X) a second latch mechanism means for releasably holding the truck at the second location;

whereby the treaded attachment of the first pin to the load-bearing plate and the second pin to the load-bearing plate allows the distance between the load-bearing plate and the track to be adjusted by torquing the first and second pins, respectively; and whereby the distance between the pins and the track is preserved by the prevention of the rotation of each pin by the jam nuts.

10. A combination for alternatively using and storing an entertainment module comprising:

(a) a tracking having a height, a length, a first planar surface and a second planar surface, the track defining a slot of substantially uniform width extending between a first location wherein the module can be stored and a second locations wherein the module can be used;

(b) a truck slidably attached to the track comprising:

(I) a load-bearing plate having a first end and a second end and being disposed proximate to and in parallel with the first surface of the track;

(II) a backing plate having a first end and a second end and being disposed proximate to and in parallel with the second surface of the track;

(III) a first pin disposed serially through (1) the first end of the load-bearing plate, (2) the slot in the track and (3) the first end of the backing plate to connect the first end of the load-bearing plate to the first end of the backing plate, the first pin being threadably attached to the load-bearing plate such that the load-bearing plate and the track are disposed spaced apart;

(IV) a second pin disposed serially through (1) the second end of the load-bearing plate, (2) the slot in the track and (3) the second end of the backing plate to connect the second end of the load-bearing plate to the second end of the backing plate, the second pin being threadably attached to the load-bearing plate such that the load bearing plate and the track are disposed spaced apart;

(V) a first jam nut threadably attached to the first pin and a second jam nut threadably attached to the second pin; and (VI) a first bushing having an outside diameter slightly smaller than the width of the slot and disposed around the first pin within the slot;

(c) an attachment rod having a first end and a second end, the first end of the rod being swivelably attached to the first end of the load-bearing plate; and (d) an entertainment module swivelably attached to the second end of the rod;

whereby the threaded attachment of the first pin to the load-bearing plate and the threaded attachment of the second pin to the load-bearing plate allows the distance between the load-bearing plate and the track to be adjusted by torquing the first and second pins, respectively; and whereby the distance between the pins and the track is preserved by the prevention of the rotation of the pins by the jam nuts.

11. The combination of claim 10 further comprising a first fluorocarbon washer disposed between the first end of the load-bearing plate and the first surface of the track, a second washer disposed between the second surface of the track and the first end of the backing plate, a third fluorocarbon washer disposed between the second end of the load-bearing plate and the first surface of the track and a fourth fluorocarbon washer disposed between the second surface of the track and the second end of the backing plate.

12. The device of claim 10 wherein the bushings are composed of polyetheretherketone and each can freely rotate about its respective pin.

13. The combination of claim 10 further comprising a housing having a top, opposing side walls and opposing end walls one of which end walls defines a housing opening sufficiently large to allow the module to pass therethrough, wherein the track is disposed within the housing and the second location is disposed proximate to the housing opening.

14. The combination of claim 14 wherein the housing is the armrest of a seat.

15. The combination of claim 14 wherein the housing is the armrest between two seats on a mode of transportation.

16. The combination of claim 10 wherein the track has a horizontal moiety proximate to the first location and an upwardly sloping moiety proximate to the second location.

17. The combination of claim 10 further comprising:

(a) first latch mechanism means for releasably holding the truck at the first location; and (b) second latch mechanism means for releasably holding the truck at the second location.

18. A combination for alternatively using and storing an entertainment module comprising:

(a) a housing having a top, opposing side walls and opposing end walls one of which end walls defines a housing opening sufficiently large to allow the module to pass therethrough;

(b) a track disposed within the housing, the track having a height, a length, a first planar surface and a second planar surface, the track defining a slot of substantially uniform width extending between a first location wherein the module can be stored and a second location wherein the module can be used;

(c) a truck slidably attached to the track comprising:

(I) a load-bearing plate having a first end and a second end and being disposed proximate to and in parallel with the first surface of the track;

(II) a backing plate having a first end and a second end and being disposed proximate to and in parallel with the second surface of the track;

(III) a first fluorocarbon washer disposed between the first end of the load-bearing plate and the first surface of the track, a second fluorocarbon washer disposed between the second surface of the track and the first end of the backing plate, a third fluorocarbon washer disposed between the second end of the load-bearing plate and the first surface of the track and a fourth fluorocarbon washer disposed between the second surface of the track and the second end of the backing plate;

(IV) a first threaded pin disposed serially through (1) the first end of the load-bearing plate, (2) the first washer, (3) the slot in the track (4) the second washer and (5) the first end of the backing plate, to connect the first end of the load-bearing plate to the first end of the backing plate, the first pin being threadably attached to the load-bearing plate such that the load-bearing plate and the track are disposed spaced apart;

(V) a second threaded pin disposed serially through (1) the second end of the load-bearing plate, (2) the third washer, (3) the slot in the track (4) the fourth washer and (5) the second end of the backing plate, to connect the second end of the load-bearing plate to the second end of the backing plate, the second pin being threadably attached to the load-bearing plate such that the load-bearing plate and the track are disposed spaced apart; and (VI) a first jam nut threadably attached to the first pin and a second jam nut threadably attached to the second pin;

(d) an attachment rod having a first end and a second end, the first end of the rod being swivelably attached to the first end of the load-bearing plate; and (e) an entertainment module swivelably attached to the second end of the rod;

whereby the threaded attachment of the first pin to the load-bearing plate and the threaded attachment of the second pin to the load-bearing plate allows the distance between the load-bearing plate and the track to be adjusted by torquing the first and second pins, respectively; and whereby the distance between the pins and the track is preserved by the prevention of the rotation of the pins by the jam nuts.

19. The combination of claim 18 wherein the housing is the armrest of a seat.

20. The combination of claim 18 wherein the housing is the armrest between two seats on a mode of transportation.

21. The combination of claim 18 wherein the housing is the armrest between two seats on an airliner.

* * * * *